Dec. 18, 1951    J. SILVIA    2,579,208
ANIMAL TRAP
Filed Sept. 26, 1944    2 SHEETS—SHEET 1
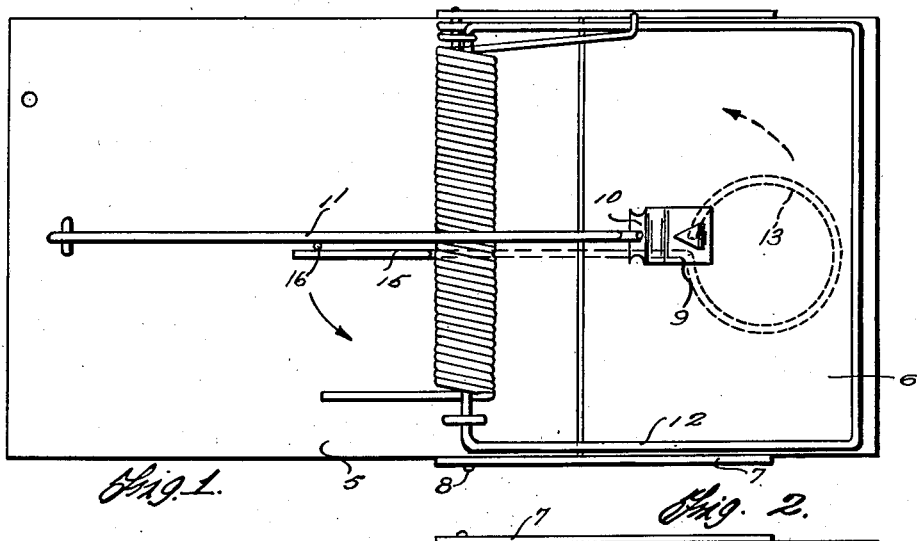
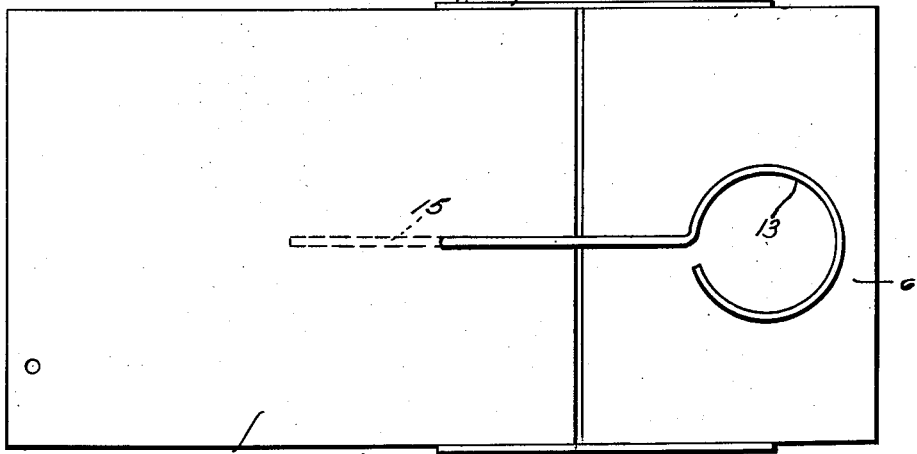
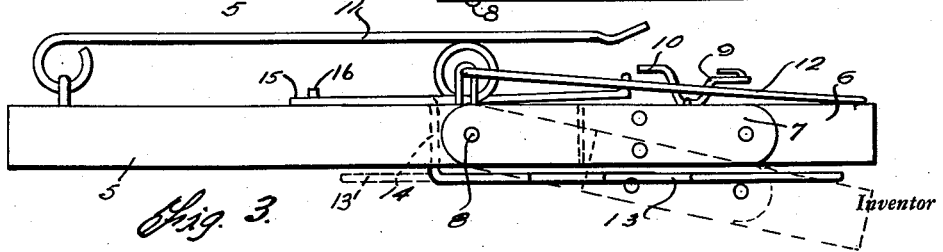
Inventor
Jeremiah Silvia
By Clarence A. O'Brien
and Harvey B. Jacobson
Attorneys Dec. 18, 1951    J. SILVIA    2,579,208
ANIMAL TRAP
Filed Sept. 26, 1944    2 SHEETS—SHEET 2
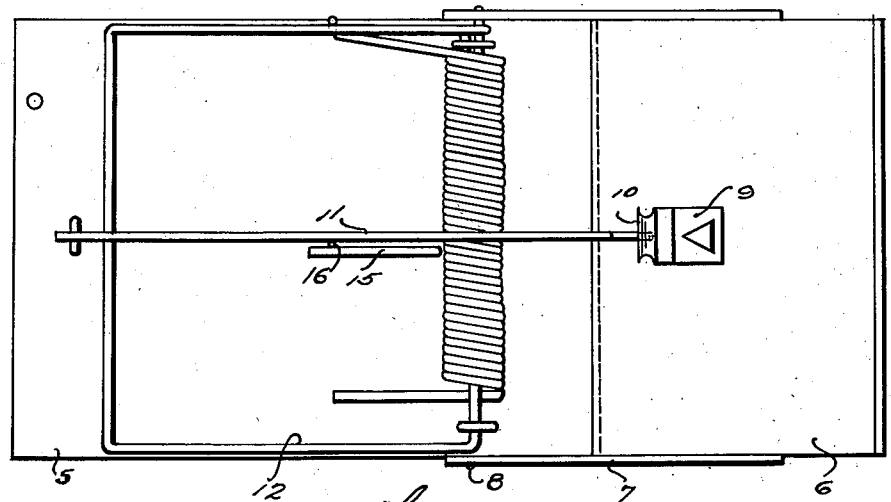
Fig. 4.
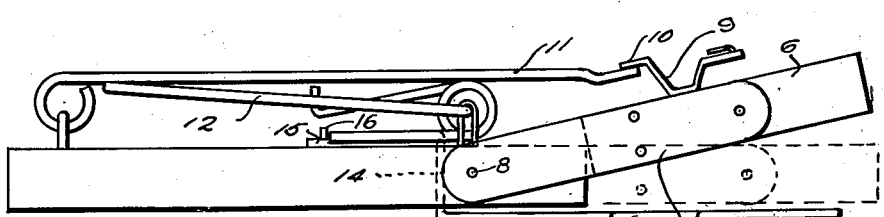
Fig. 5.
Fig. 6.
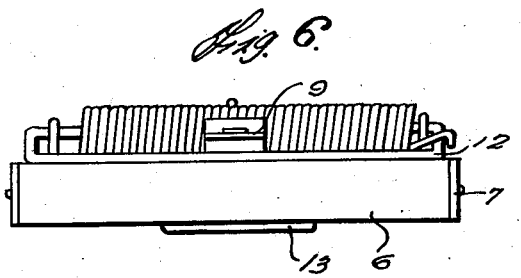
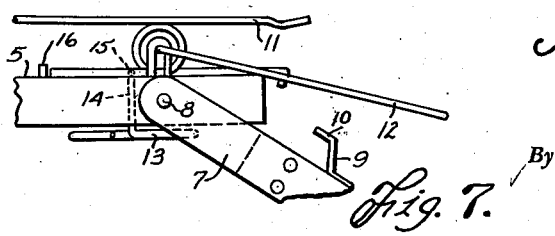
Fig. 7.
Inventor
Jeremiah Silvia
By Clarence A. O'Brien
and Harvey B. Jacobson
Attorneys Patented Dec. 18, 1951

2,579,208

UNITED STATES PATENT OFFICE 2,579,208

ANIMAL TRAP

Jeremiah Silvia, Dartmouth, Mass.

Application September 26, 1944, Serial No. 555,844

2 Claims. (Cl. 43—81)

The present invention relates to new and useful improvements in animal traps of the spring jaw type designed primarily for catching small animals, such as rats and mice.

An important object of the present invention is to provide an animal trap of this character embodying means to facilitate the release of the animals, when caught, without necessitating handling thereof.

A further object of the invention is to provide a pivoted platform for the trap on which the bait holder is mounted and operable to release the jaw of the trap by the weight of the animal on the platform.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a bottom plan view.

Figure 3 is a side elevational view showing the stop for the tilting platform in dotted lines in non-supporting position.

Figure 4 is a top plan view showing the trap in set position.

Figure 5 is a side elevational view in set position.

Figure 6 is an end elevational view.

Figure 7 is a fragmentary side elevational view showing the platform released and swung downwardly to remove an animal from the trap.

Referring now to the drawings in detail wherein for the purpose of illustration I have disclosed a preferred embodiment of the invention, the numeral 5 designates the base of the trap which may be in the form of a rectangular piece of wood or other suitable material and having at its front end a platform 6 pivotally connected to the base by means of a pair of plates 7 fixedly attached at one end to the sides of the platform and pivotally attached at their other ends to the sides of the base by pins 8, the platform thus being pivotally mounted for vertical swinging movement.

Attached to the upper surface of the platform 6 is a bait holder 9 which includes an overhanging shoulder 10 under which one end of the pivoted catch bar 11 is engageable for securing the spring actuated jaw 12 in its set position in a manner well known in the art.

In order to set the trap, the platform 6 is raised upwardly into the position shown by the full lines in Figure 5 of the drawings in order that the catch bar 11 may engage under the shoulder 10 of the bait holder, the jaw being released by the weight of the animal positioned on the platform in approaching the bait, the platform then being lowered to the position shown by the dotted lines in Figure 5 to thus spring the trap.

The platform 6 is normally held against swinging movement downwardly below the plane of the base 5 by a stop 13 in the form of a wire loop underlying the platform and having formed at one side thereof a vertical shaft 14 journaled in the base 5 adjacent the inner edge of the platform. The upper end of the shaft 14 is bent to provide a finger grip or handle 15 by means of which the shaft may be rotated to swing the stop 13 from under the platform 6 into the position as shown in Figure 7 of the drawings whereby the platform is then permitted to swing downwardly below the plane of the base. When shaft 14 is rotated anti-clockwise in the direction of arrows in Figure 1, the stop 13 will project laterally from the base 5 with the grip 15 extending transversely across the base 5. By releasing the stop 13 in the manner indicated to permit the downward swinging movement of the platform, the animal caught by the jaw 12 may be released without necessitating the handling of the animal, the front edge of the base 5 limiting the downward movement of the jaw 12 so that the platform may swing downwardly away therefrom. A stop 16 is engaged by the handle 15 when the stop 13 is in its platform supporting position as shown in Figure 1.

Although clearance has been shown in Figures 3 and 5 between the stop 13 and the bottom surface of the platform for clarity, less clearance may be provided.

It is believed that the details of construction and manner of use of the device will be readily understood from the foregoing without further detailed explanation.

Having thus described the invention, what I claim is:

1. An animal trap of the class described including a base having a spring actuated jaw thereon and a pivoted catch bar also carried by the base, a platform and means pivotally connecting the platform at the front edge of the base for vertical movement, said platform having a bait holder thereon engageable by the free end of the catch bar to secure the jaw in its set position, the catch bar being released by the weight of an animal on the platform, and a swingably mounted stop carried by the base and adapted for horizontal swinging movement into a position to underlie the platform to limit downward movement thereof.

2. An animal trap of the class described including a base having a spring actuated jaw thereon and a pivoted catch bar also carried by the base, a platform and means pivotally connecting the platform at the front edge of the base for vertical movement, said platform having a bait holder thereon engageable by the free end of the catch bar to secure the jaw in its set position, the catch bar being released by the weight of an animal on the platform, said platform being free to swing downwardly below the plane of the base out of engagement with the jaw to release the animal, and a stop swingably carried by the base and including a part swingable into a position either under the platform to hold the latter substantially in the horizontal plane of the base, or swingable into a position lying in a plane underlying the base to release the platform for tilting downwardly away from the jaw, and said stop further including a handle on top of the base for swinging the stop into either position.

JEREMIAH SILVIA.

REFERENCES CITED

The following references are of record in the file of this patent:

UNITED STATES PATENTS

| Number | Name | Date |
|---|---|---|
| 481,707 | Trumble | Aug. 30, 1892 |
| 615,218 | Hotchkiss | Nov. 29, 1898 |
| 615,219 | Hotchkiss | Nov. 29, 1898 |
| 1,726,367 | Seghers | Aug. 27, 1929 |
| 2,263,161 | Brust | Nov. 18, 1941 |

FOREIGN PATENTS

| Number | Country | Date |
|---|---|---|
| 27,488 | Great Britain | of 1898 |
| 381,280 | Great Britain | Oct. 6, 1932 |